Sept. 23, 1958     P. GÉRARD     2,852,942
GYROSCOPIC FOLLOW-UP SYSTEM
Filed Oct. 14, 1953     6 Sheets-Sheet 1
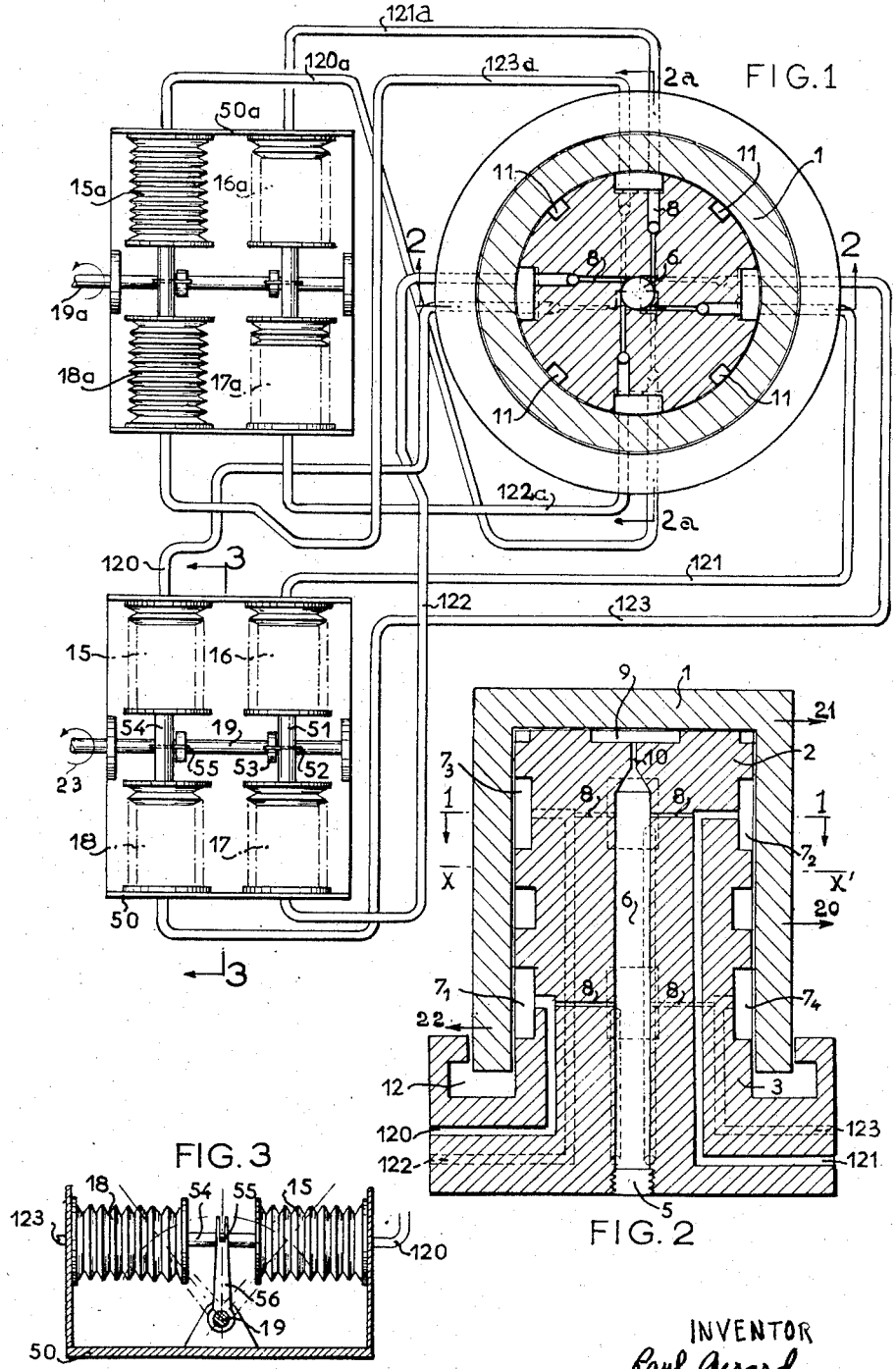
INVENTOR
Paul Gérard
By Thomson + Renard
ATTORNEYS Sept. 23, 1958　　　　P. GÉRARD　　　　2,852,942
GYROSCOPIC FOLLOW-UP SYSTEM
Filed Oct. 14, 1953　　　　　　　　6 Sheets-Sheet 2

INVENTOR:
Paul Gerard
By Thown & Seward
ATTORNEYS

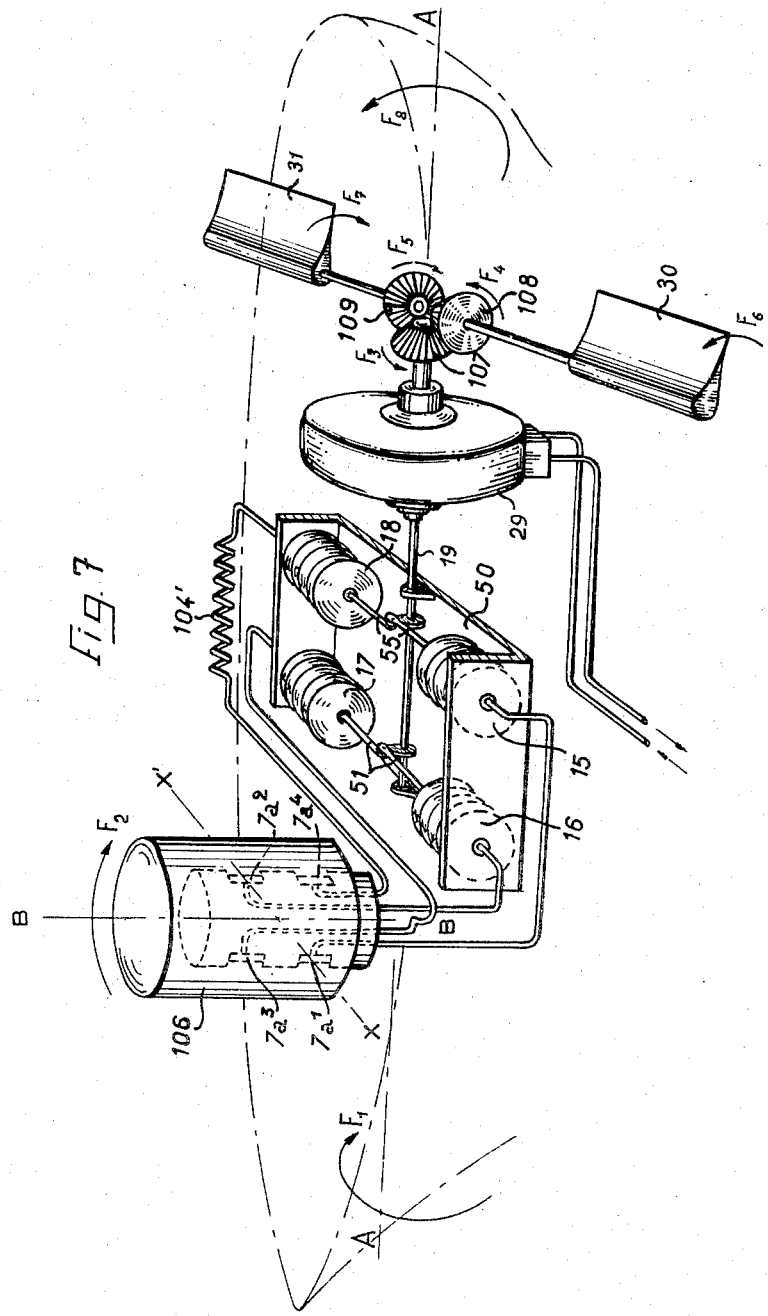

Sept. 23, 1958 P. GÉRARD 2,852,942
GYROSCOPIC FOLLOW-UP SYSTEM
Filed Oct. 14, 1953 6 Sheets-Sheet 4
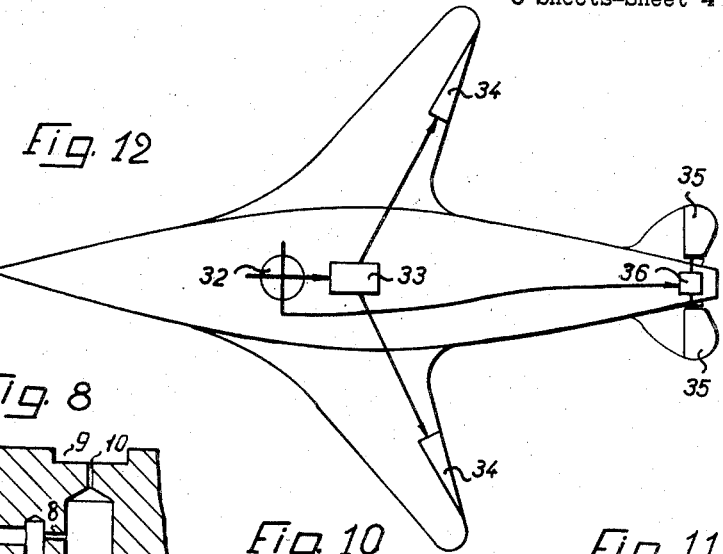
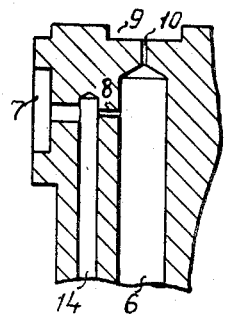
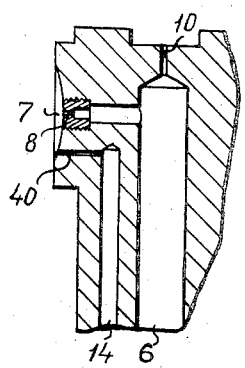
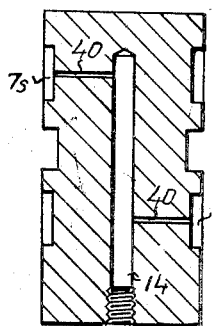
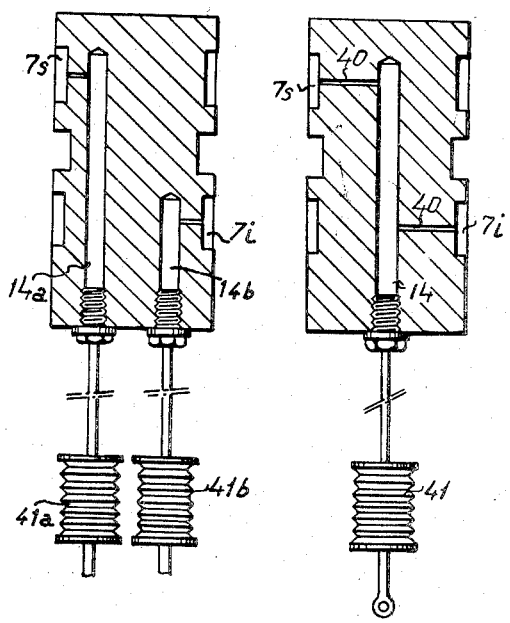
INVENTOR:
Paul Gerard
By Brown & Neward
ATTORNEYS INVENTOR:
Paul Gerard
By Brown & Reward
ATTORNEYS Sept. 23, 1958 P. GÉRARD 2,852,942
GYROSCOPIC FOLLOW-UP SYSTEM
Filed Oct. 14, 1953 6 Sheets-Sheet 6

INVENTOR:
Paul Gerard
By Brown & Award
ATTORNEYS

United States Patent Office 2,852,942
Patented Sept. 23, 1958

2,852,942

GYROSCOPIC FOLLOW-UP SYSTEM

Paul Gérard, Paris, France, assignor to Societe d'Etude et d'Exploitation du Palier Fluide, Lyon, France, a French company Application October 14, 1953, Serial No. 386,081

7 Claims. (Cl. 74—5.6)

This invention relates to a follow-up system adapted to maintain or reset the axis of a stator in a position which is parallel to or coincides with the average axis of rotation of an associated rotor. By average axis of rotation of a rotor is to be understood here the axis around which the rotor would rotate if its static and dynamic balance were perfect.

It is accordingly an object of the invention to provide such a follow-up system which is so arranged and the inertia of which is such that it remains rigorously insensitive to forces resulting from static or dynamic unbalance.

A more particular object of the invention is to provide a follow-up system of the type described the rotor of which has a sufficient mass and is imparted with a sufficient rotational speed to become sensitive to gyroscopic effects, the system thus being adapted to be used as a real gyroscope capable of determining the position of the stator axis and, hence, of a supporting member on which said stator is fixedly mounted with respect to a fixed direction in space and, more particularly, the vertical one.

The follow-up system according to the invention essentially comprises two sets of pressure fluid chambers, a pressure-responsive device adapted to control a shaft solely in response to pressure variations occurring in said chambers as a result of angular positional disagreement between the stator and rotor axes and a mechanism controlled from said shaft and adapted to compensate said positional disagreement.

It is particularly contemplated to use, for providing each set of the above-mentioned chambers, a fluid bearing of the type described in the patent application filed in the United States of America on July 8, 1950, under Serial No. 172,666 by Paul Gerard and Henri Seranne (now Patent No. 2,660,484), for: "Fluid Bearings" and in the patent application filed in the United States of America on August 8, 1951, under Serial No. 240,959 by Paul Gerard (now Patent No. 2,660,485) for: "Fluid Supports."

A more particular object of the invention is to interpose between the mechanism provided for resetting the stator into coaxial relationship with the rotor and the control shaft of said mechanism a dash-pot for integrating the angular displacements of said shaft even if the same are extremely small, which ensures resetting after a more or less important delay but with certitude, whatever the speed at which the positional disagreement took place.

Now, it is also possible, by neglecting certain advantages of the follow-up system according to the invention, to design simplified embodiments of the same.

In one of these simplified embodiments, only one set of pressure fluid chambers is provided between the stator and rotor, the device then merely constituting a fluid bearing of the type described in the above cited applications, a conventional bearing being then substituted for the omitted set of chambers. It is obvious that in such a simplified embodiment the follow-up system according to the invention becomes responsive to accelerations along directions right-angled to the axis of the rotor. In certain applications, however, such as in ship gyroscopes, said accelerations are limited and it is clear that such a simplified apparatus will be sufficient.

Such simplified embodiments may be used also for controlling the load of a tool-carrying shaft on one of its bearings.

Finally, instead of using the pressure variations in the chambers of the follow-up system according to the invention for controlling purposes, it will be easily understood that said pressure variations may be merely measured, if desired, by means of a pressure-indicator interposed in a suitable circuit interconnecting said chambers.

Other objects and advantages of the invention will be apparent from the following detailed description, together with the accompanying drawings, submitted for purposes of illustration only and not intended to define the scope of the invention, reference being had for that purpose to the subjoined claims.

In the drawings:

Fig. 1 is a horizontal sectional view along line 1—1, of Fig. 2 of the stator and rotor of the device of this invention, connected to systems of bellows (shown in plan) which are responsive to the variations of pressure in the chambers of the stator.

Fig. 2 is a sectional view of the stator and rotor, taken on the line 2—2 of Fig. 1. A section on the line $2a$—$2a$ would be identical except that the reference numerals 120—123 would then be $120a$ to $123a$.

Fig. 3 is a detail vertical sectional view on the line 3—3 of Fig. 1.

Fig. 7 shows the application of a gyroscope according to this invention to the stabilization of a ship against roll.

Figs. 8 to 11 are detailed sectional views of certain of the fluid passages of Figs. 1 to 3.

Fig. 12 represents a method of applying a gyroscope of this invention to the stabilization of an aircraft in both pitch and roll.

Figure 4:
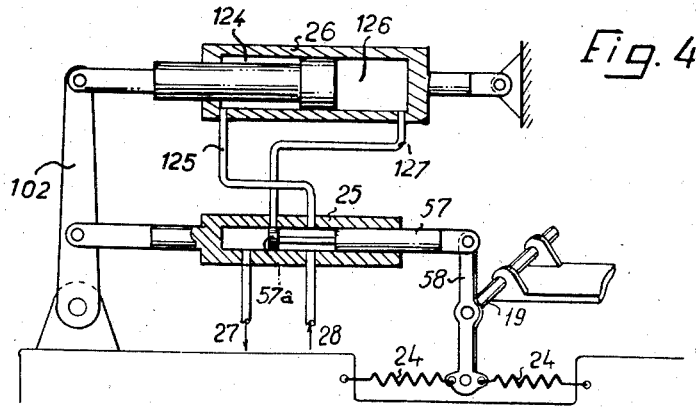
Fig. 4 is a schematic view and a partial section of means for controlling the position of a stator, for example such as the stator in Fig. 1, from a system responsive to the speed of deviation of the gyroscope.

In the embodiment shown in Figs. 1 to 3, a rotor 1 having a generally vertical axis is mounted on a stator which has on its periphery two bearing stages 2 and 3, each of which includes two chambers $7_2$—$7_3$ and $7_4$—$7_1$, the longitudinal axes of chambers $7_3$, $7_1$ on one hand, and $7_2$, $7_4$ on the other hand, being disposed along two diametrically opposed generatrices of the stator. The rotor 1 is, in this example, in the form of a cylindrical cup having elongated sides whose bottom is mounted for rotation on the top of the stator by fluid under pressure led into a central recess 9 as to be later described. The feeding fluid enters at 5 into an axial passage 6. The different lateral chambers $7_1$, $7_2$, $7_3$, $7_4$ are supplied by nozzles 8 and the recess 9 is supplied by a nozzle 10. The fluid which escapes from the chambers $7_1$—$7_4$ and 9 descends through grooves 11 into lower chamber 12 from which it is returned to the reservoir by a return line, not shown. Finally, the pressure connections with which each chamber $7_1$—$7_4$ is provided, supply through conduits 120, 121, 122, and 123, respectively, an assembly of four bellows 15, 16, 17 and 18, all of which are mounted on a common support 50. The movable elements of bellows 16 and 17 are linked together through a rod 51 which is articulated at 52 on a crank arm 53 and the movable elements of bellows 15 and 18 are linked together through a rod 54 which is articulated at 55 on a crank arm 56; the arms 53 and 56 are keyed against rotation on shaft 19.

Considering the chambers contained in the plane of Fig. 2, the lower chamber on the left, $7_1$, communicates through conduit 120 with one of the elastic bellows 15. The upper right hand chamber $7_2$ communicates through conduit 121 with the other elastic bellows 16 on the other side of shaft 19 as the bellows 15. The upper chamber on the left $7_3$ communicates through conduit 122 with one of the elastic bellows 17. The lower chamber on the right $7_4$ communicates through conduit 123 with the other elastic bellows 18 on the same side of shaft 19 as the bellows 17. The bellows 15 and 16 tend to push the eccentric arms 53 and 56 leftwards (Fig. 3) when their volume is increased. Similarly, bellows 17 and 18 tend to push these same eccentric arms rightward (Fig. 3) when their volume is increased.

The chambers in the plane of the line 2a—2a are connected in a corresponding manner by conduits 120a—123a to the bellows and shaft system 15a—19a, the construction and operation of which correspond in all respects to the construction and operation of the parts just described.

The operation of the device is easy to understand: let us suppose at first that the axis of the stator coincides with the axis of the rotor, both axes being substantially vertical. Under such a condition, the pressure in $7_1$, $7_2$, $7_3$ and $7_4$ are equal, and likewise the pressures are equal in bellows 15, 16, 17, 18, and shaft 19 has no load on it.

Supposing, on the other hand, that the axis of the rotor was displaced to the left (Figs. 1 and 2) with respect to the axis of the stator; for example, under the effect of a horizontal acceleration applied to the stator, the pressure in $7_2$, $7_4$ and, consequently, in 16 and 18 would be increased, while that in $7_1$, $7_3$, and, consequently, in 15 and 17 would be decreased by the same amount. The bellows 16 and 18 would apply equal forces in opposite senses on both eccentric arms while the bellows 15 and 17 would pull on these arms with opposite and equal forces. Shaft 19 is thus subjected only to torsional forces and neglecting its elasticity, the shaft will not be rotated at all.

Supposing, now, that the axis of the stator was fixed and the rotor, because of bad static balance, produces a rotating centrifugal force, as indicated at 20, acting simultaneously at each instant and in the same direction on both stages of the bearings. This defect would be the one which would correspond particularly to a slight relative eccentricity of the internal and external surfaces of rotor 1, the axes of these surfaces being nevertheless parallel. It is obvious that the only variations of pressure thus produced would not, as in the preceding instance, cause any resulting displacement of shaft 19.

Assuming that the axis of the stator were fixed, and the rotor statically balanced but dynamically unbalanced, in other words, assuming that there were rotating forces 21—22 creating an overturning couple on the rotor, under these conditions at the instant shown in the example of the figure, the pressures in $7_3$ and $7_4$ will have risen, the two bellows 17 and 18 tending consequently to increase their volume act simultaneously and in the same direction on the arms 53 and 56, which determines the application of a torque as indicated at 23 to the shaft 19.

When the rotor has made a half turn, the shaft 19 will be subjected to a couple equal and opposite to 23 under the simultaneous pressure of the bellows 15 and 16. The shaft 19 is alternately pushed in one direction and then in the other and this would occur at the frequency of rotation of the rotor 1. Thus, if the rotational speed of the rotor is sufficiently large, the inertia and mainly that of the system of bellows, and the viscosity of the fluid will assure the transmission to this system of the variations of pressure which take place in the chambers and will prevent the shaft from being displaced at all. On the other hand, if one attempts to turn the stator about an axis XX' perpendicular to its principal axis and contained in the plane of the figure, and if the rotor has a sufficient mass and a sufficient rotational speed to produce a noticeable gyroscopic effect, an overturning couple such as 21—22 is generated. As noted in the preceding example, the couple 21—22 turned with the rotor, this time couple 21—22 is related to the stator. Under these conditions the pressures in the chambers $7_3$ and $7_4$ are increased and thereupon remain constant while the pressures in the chambers $7_2$ and $7_1$ decrease in the same amount, then likewise remain constant. The increase of pressures in chambers $7_3$ and $7_4$ determines an increase of the volume of bellows 17 and 18 and the decrease of pressure in the chambers $7^2$ and $7_1$ determines a corresponding decrease of the volume of bellows 16 and 15. The movable elements of bellows 17 and 18 apply simultaneous forces on the eccentric arms 53, 56, and, hence, a couple 23 to the shaft 19, which will result in a certain angular displacement of this shaft, after which it will remain in its new position if nothing occurs to modify the constant pressures indicated above then built up in the chambers of the stator.

By virtue of gyroscopic laws, the couple 23 is algebraically proportional to the speed of displacement of the stator around its axis XX'.

It can thus be seen that the arrangement which has just been described produces with a rotor, a stator, and a system of bellows not mounted on gimbals, a gyroscopic device which conforms to the first characteristic of the invention indicated in the preamble, and which is responsive only to displacements of the stator and is insensitive to gravity, to inertia of translation, to defects of balance in the rotor, to accelerations of the stator, or to other analogous external forces.

Shaft 19 can operate any mechanical, hydraulic, electric or electronic device to assure the stability and equilibrium of the support on which is mounted the stator of the gyroscope and more generally maintain the axis of the stator in a fixed direction, for instance, as in the example described, in the vertical one. The only essential thing which must always be taken into account is that shaft 19 be subjected to the action of a device which prevents it from moving freely. If this is omitted, the pressures in the bellows, and thus in the chambers of the stator, could vary freely and said chambers would lose their fundamental function of assuring the mechanical isolation between the rotor and the stator.

Supposing, for example, that shaft 19 operates a lever 102, it is possible, as seen in Fig. 4, to stabilize shaft 19 by means of an elastic system 24, insert a sliding valve 25 between lever 102, and arm 58 mounted on shaft 19, and finally to drive the end of lever 102 by a jack 26 which has an interior annular compartment 124 permanently connected with a source of pressure 28 through a duct 125, while the cylindric compartment 126 can be selectively connected through a duct 127 either with the pressure source 28 or with a return line 27 by means of the active end 57a of the stem 57 of the sliding valve 25. This constitutes a well known hydraulic follow-up system. Such a system assures, at steady rate and not during transient periods a corresponding relationship between the positions of shaft 19 of the bellows system on one hand, and the control lever 102 on the other hand.

A device according to Fig. 1, when combined with that of Fig. 4, operates in the following manner:

For example, a shifting of the gyro, such as a rotation about axis XX′ of Fig. 1, produces an overturning couple 21—22. According to gyroscopic laws, this couple is proportional to the angular velocity of said shifting. The following chain of events takes place: the differential pressure variation is proportional to the overturning couple; in the bellows system, the angular displacement of the shaft 19 relative to its average position is proportional to the differential pressure variation.

Thus, shaft 19 is positively displaced from its average position an amount proportional to the angular velocity of displacement of the gyro. In particular, as soon as the gyro comes to a standstill, shaft 19 again takes its average position, even if the gyro does not assume its original position again. Such an arrangement, applicable in certain instances, has serious drawbacks in others. Let us suppose, for example, that it is desired to stabilize an aircraft on a given direction of flight, and assuming that its stability in one plane of flight is otherwise ensured, the gyroscope is installed with its axis parallel to the longitudinal axis of the aircraft in a well known manner, as indicated diagrammatically in Fig. 6, and a device similar to that of Fig. 4 is used at 105. Supposing that the aircraft turns to the right or the left, the displacement about an axis XX′ produces an overturning couple 21—22 which acts on lever 102, which controls the vertical rudder 101. This rudder is then turned on its axis, and in the foregoing manner, the angle of deflection is proportional to the velocity of displacement of the gyro around axis XX′. The turning of the control surface opposes the deviation of the aircraft from its flight path, and, consequently, the velocity of this deviation decreases down to zero. At the moment at which the deviation ceases, the control surface again takes its position in the axis of the aircraft and the latter continues on its course in a false direction, thus, while it is true that the correcting device functions while there is a velocity of displacement, this device ceases to function when the velocity of displacement drops to zero even though a deviation continues to exist.

Figure 6:
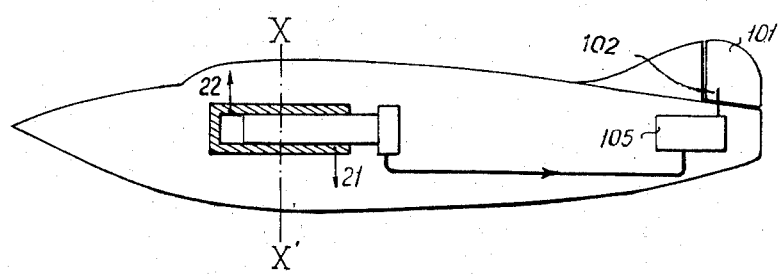
Fig. 6 shows an application of the devices of Figs. 4 and 5 to the stabilization of an aircraft.

In summary, a device such as that of Figs. 1, 4 and 6 is capable of producing a corrective effect proportional, not to the shifting of the gyro, but to the velocity of said shifting.

Figure 5:
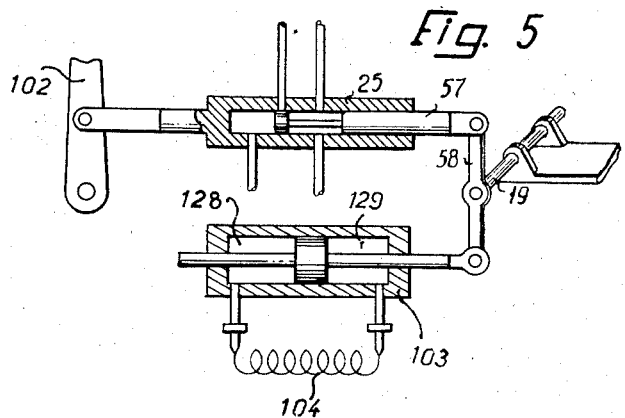
Fig. 5 is a modification of Fig. 4 in which the device is responsive to the amplitude of said deviation.

Fig. 5 represents an alternative embodiment of this invention in which the device, instead of being sensitive to the velocity of the shifting, is responsive to its amplitude.

In this version, the system of springs 24 has been replaced by a hydraulic dash-pot device schematically represented at 103 in which the two dash-pot compartments 128 and 129 are connected by a hydraulic resistance or orifice 104 calculated to provide laminar flow through it.

As previously, in the device of Fig. 5, the differential variation of the pressures in the bellows (not shown), is proportional to the velocity of shifting of the gyro.

However, due to the substitution of dash-pot 103 for springs 24, it is no longer the angular position of shaft 19 relative to its average position which is proportional to the differential pressure variation, but rather the velocity of variation of this angular position.

Finally, the rate of change of angle of shaft 19 is proportional to the velocity of shifting of the gyro, consequently, the angular position of shaft 19 relative to its average position is proportional to the amplitude of shifting of the gyro.

Let us suppose that in the airplane of Fig. 6, the device of Fig. 5 is installed at 105 instead of that of Fig. 4, at all times the vertical rudder 101 will make an angle with respect to the axis of the aircraft which is proportional to the deviation of the gyro, and, consequently, the rudder will be in a neutral position only if the deviation of the gyro is zero.

Let us note that it is possible to simplify advantageously a system of bellows and dash-pot such as partially shown in Fig. 5, by allowing the bellows to act as dash-pots. To achieve this, it is only necessary to insert a hydraulic resistance 104′ in the pressure supply system of any one of the bellows, such as shown for example at Fig. 7. In such a device, the angle between the position of axis 19 and its average position is proportional to the deviation of the gyro.

In the example of Fig. 7, the device of this invention is used to stabilize a ship against roll.

Assuming AA as the axis of roll, the gyroscopic device 106 is mounted with its axis BB perpendicular to AA. The chambers $7a_1$, $7a_2$, $7a_3$, $7a_4$ of the fluid bearings of this device which are contained in the plane of symmetry of the ship are connected with a block of bellows 50 of which the output shaft 19 controls a torque amplifier 29 in the nature of a pressure fluid (hydraulic) motor, not shown in detail. The output shaft of the amplifier operates through bevel gears 107, 108, 109 two ailerons 30 and 31.

The operation is as follows: suppose a rolling movement takes place along arrow $F_1$. This movement produces an overturning couple $F_2$ in the rotor of the gyroscope around axis XX′. As this axis is at right angles to axis AA, the resulting variations of pressure determine a rotation of shaft 19 and the torque amplifier in the direction $F_3$, and thus of the bevel gears in the direction $F_4$ and $F_5$, and of the ailerons in the direction $F_6$ and $F_7$, which produces a hydrodynamic couple $F_8$ opposed to the roll $F_1$.

In the example of Fig. 7, only the reactions of a gyroscopic device on one axis were used. This arrangement can be multiplied in the event that stabilization is required on several axes. Consider Fig. 12, an airplane. Suppose this airplane contains a gyroscopic device 32 having its axis normally vertical, the chambers of this device contained in the mid-longitudinal plane of the aircraft will react on a block of bellows in the servo unit 33 relative to the ailerons 34, while the chambers of the device contained in a plane at right angles to said mid-longitudinal plane of the aircraft will react on another block of bellows controlling a servo unit 35 relative to the elevators 36.

One can likewise use the device of this invention to stabilize not only around one or two axes, but in a much more general way.

Figure 14:
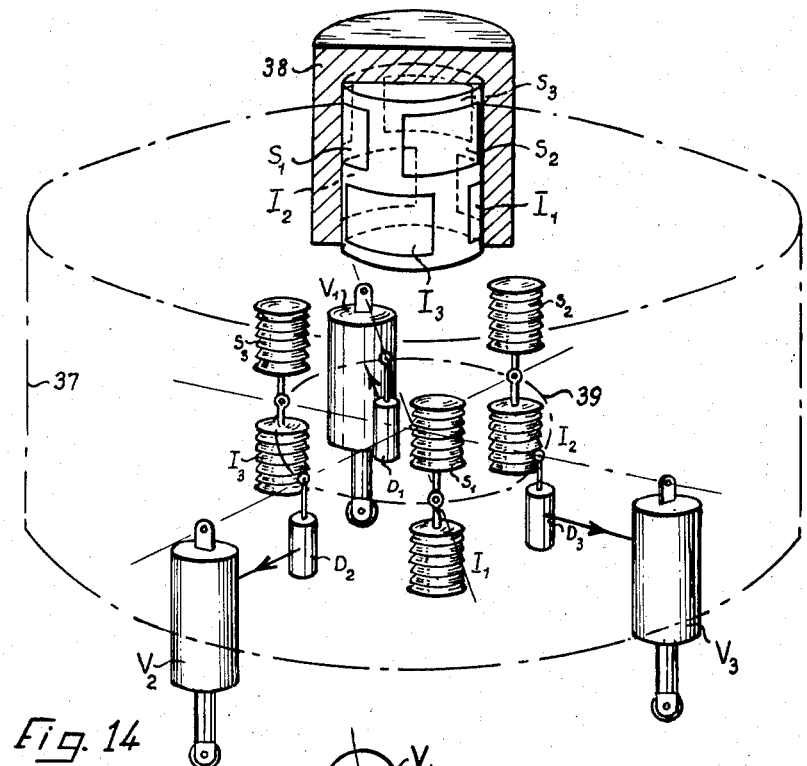
Figs. 13 and 14 show another application of the gyroscope of this invention to the stabilization of a vertically suspended frame such as a passenger cabin.
Figure 13:
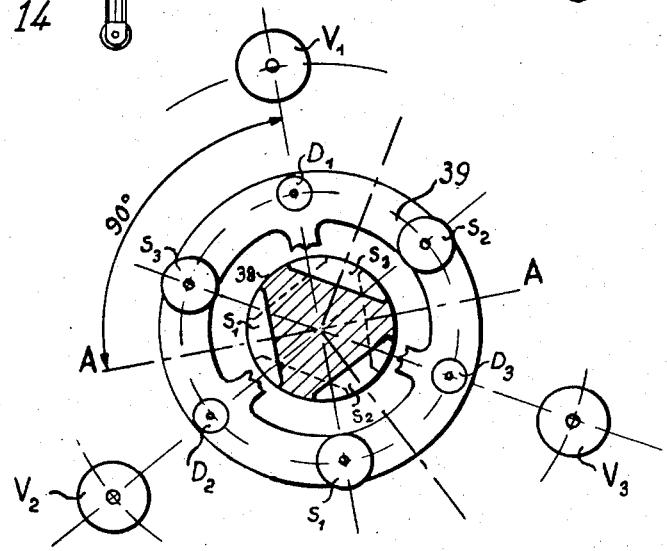

Figs. 13 and 14 are an example of such a generalized stabilization.

Suppose 37 is a mass resting on three jacks $V_1$, $V_2$, $V_3$ on a movable base not shown. Suppose it is necessary to isolate this mass from both rolling and pitch movements of the base. For example, 37 could be a special deluxe cabin on a ship. On mass 37 is mounted a gyroscopic device 38. To clarify the view of this figure, the rotor has been sectioned and the chambers of the stator are represented schematically. $S_1$, $S_2$ and $S_3$ are three upper chambers while $I_1$, $I_2$, $I_3$ are three lower chambers. Each chamber corresponds to a bellows having the same reference number. The bellows are arranged in pairs and drive a disc 39 which is mounted on a ball and socket joint at its center. Finally, disc 39 operates sliding valves $D_1$, $D_2$, $D_3$ controlling jacks $V_1$, $V_2$, $V_3$ respectively. The plane passing through the axis of the device and containing the chambers $I_1$, $S_1$, is perpendicular to the plane passing through the axis of the device and containing bellows $I_1$, $S_1$, the sliding valve $D_1$ and the jack $V_1$. The same holds true for the elements carrying index numbers 2 and 3.

Suppose that the movable base (not shown) on which rest the three jacks $V_1$, $V_2$, $V_3$ has a tilting movement around an axis AA (Fig. 13). This causes immediately in the gyro rotor, an overturning couple around an axis perpendicular to AA and reacting on pressures in $I_1$ and $S_1$ from whence reaction takes place on sliding valve $D_1$ and jack $V_1$ to protect the cabin 37 against the movement of the movable base.

Finally, one will find below a detailed description of certain fluid conducting elements of the device of this invention.

It was seen (Figs. 1 to 3) (and as noted with regard to detailed Fig. 8) that each pressure take-off outlet 14 is connected between a nozzle 8 and the corresponding chamber 7. This arrangement applies to the case where fluid which supplies the bearing is a liquid. If the fluid is gaseous (air) the existence of a "dead" volume in outlets 14 will produce vibrations due to the compressibility of the air, unless the solution of Fig. 9 is used where a very narrow nozzle 40 is interposed between zone 7 and the pressure take-off outlet 14.

On the other hand, it was assumed (Fig. 10) that the pressure in an upper chamber $7s$ and the pressure in the lower chamber $7i$, diagonally opposite to the former, were led by separate ducts $14a$, $14b$ into two bellows $41a$, $41b$ acting in the same direction on the element to be controlled.

As shown in Fig. 11, there is a simple way to use a single pressure take-off 14 and a single bellows 41. It is only necessary to interpose between the pressure take-off 14 and the chambers $7s$ and $7i$ two equally resisting nozzles 40. It is then certain that the pressure in 14 is the average pressure between the pressures at $7s$ and $7i$, and the large resistance which the fluid must overcome in passing in series through the two nozzles 40 results in practically no change in the levels of pressure in $7s$ and $7i$.

Figure 15:
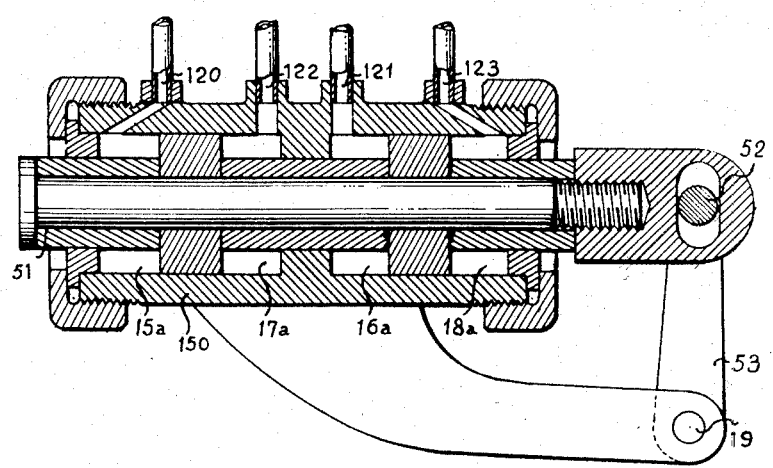
Fig. 15 shows another embodiment of the pressure responsive device cooperating with the pressure chambers of the stator described with reference to Figs. 1 to 3.
Figure 16:
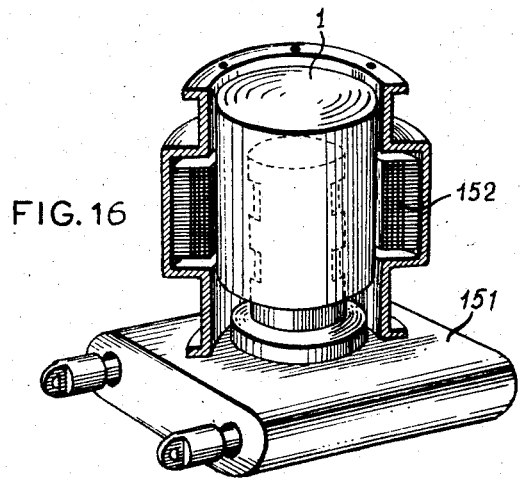
Fig. 16 shows an electrically driven gyroscope according to the invention adapted to control the pressure responsive device disclosed in Fig. 15.

In the various embodiments described above, it was assumed that, whenever a difference between two pressures was to be used, said pressures were introduced into oppositely acting bellows, but it is obvious that it is also possible, within the scope of the invention, to bring said pressures into the opposite compartments of a jack. Thus, as shown in Fig. 15, the device of Fig. 1, which comprised four bellows 15, 16, 17, 18 may be replaced by a jack provided with four compartments $15a$, $16a$, $17a$, $18a$ fed from ducts 120, 121, 122, 123, respectively, so that the pressures in $15a$ and $16a$ cooperate against the pressures in $17a$ and $18a$. This device operates exactly as that of Fig. 1, but it permits designing far more compact structures, such as the assembly shown in Fig. 16, which is constituted by a gyroscope 1, e. g. having its axis vertical and two pressure-responsive units 150, 151, constituting e. g. two control members to compensate roll and pitch motions, respectively. In this embodiment, the rotor of gyroscope 1 also constitutes the rotating part of an electric motor the stator winding 152 of which is accommodated in a casing surrounding the rotor and forming a part of the stator of the gyroscope.

It is to be understood that the invention is not limited to the examples shown and described but is applicable to numerous variations known to one skilled in the art along the lines envisaged and without departing from the spirit of the invention.

What is claimed is:

1. A gyroscopic device for controlling the position of an object with respect to the gyroscope, comprising an inner stator and an outer rotor fitting said stator with clearance space to allow for relative lateral movement therebetween, a plurality of circumferentially spaced recesses formed in the periphery of said stator, means to feed separately pressure fluid to each of said recesses whereby the position of said rotor controls the escape of fluid from said recesses into said clearance space and thus determines the pressures in said recesses to hold the rotor in a normal running position, and means responsive to changes in recess pressures due to shifting of the rotor from its normal running position for causing changes in position of said object with respect to the gyroscope.

2. A gyroscope according to claim 1, further comprising means to drive the rotor at a high speed, whereby said rotor is subjected to gyroscopic effects.

3. A gyroscopic device according to claim 2, in which said means are constituted by an electric stator winding operatively associated with said rotor and means incorporated in said rotor to transform the same into an electric rotating armature.

4. A gyroscopic device for controlling the position of an object with respect to the gyroscope, comprising an inner stator and an outer cylindrical rotor fitting said stator with clearance space to allow for relative lateral movement therebetween, a first set of circumferentially equally spaced chambers formed in the periphery of said stator, a second set of circumferentially equally spaced chambers formed in the periphery of said stator in axially spaced relation to said first set, each chamber of said first set being open toward said clearance space in a direction opposite to that of a chamber of said second set, means to feed separately pressure fluid to each of said chambers whereby the position of said rotor controls the escape of fluid from said chambers into said clearance space and thus determines the pressures in said chambers to hold the rotor in a normal running position, a pressure fluid outlet in each of said chambers, a pressure responsive device comprising a number of variable volume capacities each of which communicates with one of said outlets and has a movable element, and a displaceable member acted upon by all said movable elements so as to be displaced only in response to pressure variations in said chambers due to angular shifting of the rotor from its normal running position to thereby effect changes in position of said object with respect to the gyroscope.

5. A gyroscopic device for controlling the position of an object with respect to the gyroscope, comprising an inner stator and an outer cylindrical rotor closed at one end and fitting said stator with clearance space to allow for relative lateral movement therebetween, one end surface of said stator cooperating with the inner surface of said closed end of the rotor so as to act as thrust bearing therefor, a pressure chamber formed in said end surface of the stator and two axially spaced sets of at least two diametrically opposed pressure chambers formed in the periphery of said stator, each chamber of one set opening toward said clearance space in a direction opposite to that of a chamber of the other set to form therewith a pair of coacting control pressure chambers, means to feed separately pressure fluid to each of said pressure chambers so as to floatably support said rotor on said stator whereby the position of said rotor controls the escape of fluid from said pressure chambers into said clearance space and thus determines the pressures in said chambers to hold the rotor in a normal running position and also determines pressure differentials between two pairs of coacting control pressure chambers due to angular shifting of the rotor from its normal running position, movable means responsive to the pressures in said control pressure chambers and interconnected in such a manner that any movement of the pressure responsive means of one pair of coacting control pressure chambers is accompanied by a movement in opposite direction and of same amplitude of the pressure responsive means of the other pair of coacting control pressure chambers, and means for transmitting the movements of said pressure responsive means to said controlled object so as to change the position thereof in accordance with said pressure differentials.

6. A gyroscopic device according to claim 5, in which said movable pressure responsive means are constituted by bellows.

7. A gyroscopic device according to claim 5, in which said movable pressure responsive means are constituted by two mechanically interconnected pistons slidable each in one of two separate cylinder compartments of equal volume, the cylinder spaces at both sides of said pistons communicating each with a corresponding control pressure chamber.

References Cited in the file of this patent

UNITED STATES PATENTS

| | | |
|---|---|---|
| 1,992,970 | Sperry | Mar. 5, 1935 |
| 2,216,800 | Baldenhofer | Oct. 8, 1940 |
| 2,226,191 | Alkan | Dec. 24, 1940 |
| 2,278,081 | Kramer | Mar. 31, 1942 |
| 2,293,293 | Harcum | Aug. 18, 1942 |
| 2,328,163 | Moore | Aug. 31, 1943 |
| 2,368,628 | Bates | Feb. 6, 1945 |
| 2,660,886 | Millmore | Dec. 1, 1953 |
| 2,675,652 | Chiappulini | Aug. 20, 1954 |
| 2,692,803 | Gerard | Oct. 26, 1954 |